(12) United States Patent
Dryer et al.

(10) Patent No.: US 8,019,698 B1
(45) Date of Patent: Sep. 13, 2011

(54) SELECTION OF GRAPHICAL USER INTERFACE AGENTS BY CLUSTER ANALYSIS

(75) Inventors: David Christopher Dryer, San Jose, CA (US); Leslie Robert Wilson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/767,928

(22) Filed: Dec. 17, 1996

(51) Int. Cl.
*G06N 5/00* (2006.01)

(52) U.S. Cl. ............................................ 706/11; 706/45

(58) Field of Classification Search .................. 379/265, 379/266, 265.06; 706/11, 45; 705/42; 709/202
See application file for complete search history.

(56) References Cited

U.S. PATENT DOCUMENTS

| | | | | |
|---|---|---|---|---|
| 4,694,483 A * | 9/1987 | Cheung | ............................ | 379/34 |
| 5,185,780 A * | 2/1993 | Leggett | ............................ | 379/34 |
| 5,206,903 A * | 4/1993 | Kohler et al. | ................. | 379/309 |
| 5,301,320 A * | 4/1994 | McAtee et al. | .................... | 705/9 |
| 5,327,490 A * | 7/1994 | Cave | .............................. | 379/216 |
| 5,335,269 A * | 8/1994 | Steinlicht | ....................... | 379/266 |
| 5,467,391 A * | 11/1995 | Donaghue, Jr. et al. | ....... | 379/265 |
| 5,517,566 A * | 5/1996 | Smith et al. | ..................... | 379/265 |
| 5,557,518 A * | 9/1996 | Rosen | .............................. | 380/24 |
| 5,592,543 A * | 1/1997 | Smith et al. | ..................... | 379/265 |
| 5,655,081 A * | 8/1997 | Bonnell et al. | ................. | 709/202 |
| 5,682,482 A * | 10/1997 | Burt et al. | ......................... | 705/42 |
| 5,710,918 A * | 1/1998 | Lagarde et al. | .................. | 707/10 |
| 5,721,770 A * | 2/1998 | Kohler | ........................... | 379/266 |
| 5,727,950 A * | 3/1998 | Cook et al. | ...................... | 434/350 |
| 5,745,754 A * | 4/1998 | Lagarde et al. | ................ | 707/104 |
| 5,752,246 A * | 5/1998 | Rogers et al. | .................... | 707/10 |
| 5,761,663 A * | 6/1998 | Lagarde et al. | .................. | 707/10 |
| 5,784,452 A * | 7/1998 | Carney | ....................... | 379/265.06 |
| 5,790,789 A * | 8/1998 | Suarez | ....................... | 395/200.32 |
| 5,796,951 A * | 8/1998 | Hamner et al. | ........... | 395/200.53 |
| 5,799,297 A * | 8/1998 | Goodridge et al. | ................ | 707/1 |

* cited by examiner

*Primary Examiner* — Wilbert L Starks, Jr.
(74) *Attorney, Agent, or Firm* — Matthew W. Baca

(57) ABSTRACT

Intelligent computer implemented agents are associated with computer user interface tasks by dividing the tasks into statistically distinct clusters based on sampled user assessments. The assessments collect data on multiple user variables. Multivariate statistical analysis is used to divide the tasks into distinct clusters. The clusters are validated using univariate analysis on each of the measured variables. Intelligent agents are associated based on the measured variables to ensure that agents are effective. The objective assessment and association avoids costly creation and overhead of agents applied where not effective.

9 Claims, 2 Drawing Sheets

SELECTION OF GRAPHICAL USER INTERFACE AGENTS BY CLUSTER ANALYSIS

BACKGROUND OF THE INVENTION

1. Field of the Invention

The present invention relates to a system and process for creating computer systems with intelligent agent capability. In particular, the present invention relates to a system and process for applying intelligent agent technology to human-computer interaction tasks in a computer system.

2. Background and Related Art

Intelligent agents in computer systems help the system user perform system tasks with increased accuracy. User interface intelligent agents assist the system user in performing user interface tasks. These agents attempt to enhance the human computer interface by intelligently interacting with the user in the performance of a specific task.

Intelligent agents can be classified according to their levels of "intelligence" and "agency." The characteristics of a particular agent can be described using a two dimensional graph as shown in FIG. 1. "Intelligence" measures the level of inference applied by the agent. Highly inferential agents apply artificial intelligence (AI) principles to exhibit adaptable behavior, reasoning, learning and non-algorithmic problem solving. "Agency" measures the degree of autonomy an agent exhibits. As agency increases the agent becomes more autonomous and authoritative; the agent can perform more of the tasks without specific user direction.

The most common user interface agents are commonly called "wizards." Wizards assist the user in performing a task by breaking down the task into a linear series of steps that are presented to the user one at a time. Ideally, each step can be completed by the person and the selected sequence of steps guarantees success. Wizards replace a standard graphical user interface that offers a multitude of possible behaviors with a more restricted view that presents each step of a task in order. Wizards exhibit very little "intelligence" because they do not apply any AI techniques to the task. Instead, wizards are used to direct the user in the performance of a specific task. A wizard "knows" a specific task and can direct performance of that task according to the known algorithm for that task. Wizards are autonomous because they carry out much of a task for the user. A well-designed wizard autonomously completes the steps of the task that do not require the user's attention.

"Guides" are another kind of user interface agent. Guides monitor a user's interaction with the information system and present information appropriate to the particular user and information system state. A guide can annotate the user interface to communicate how to perform the next step and to draw the user's attention to where the next step will occur. Guides apply artificial reasoning to note those areas of the interface where annotation would be useful. The annotation can be adaptively altered to respond to the user's level of experience. Guides provide procedural direction to the user, but they have less autonomy than wizards. Guides annotate existing interfaces helping the user to learn the interface and help the user in learning the use of the raw interface. Wizards, in contrast, replace existing interfaces with a new interface tailored to accomplish the specific task.

The coverage of a particular set of agents and guides can be shown graphically. FIG. 1 at 102 illustrates the characteristics of wizards: low on inference and high on autonomy. Guides are characterized at 104 with high intelligence and low autonomy. Other categories of user interface agents can exist in different sectors with different levels of agency and intelligence.

The application of guides and wizards to information system tasks has historically been made based on the designers' opinions of their usefulness. Thus, a wizard may be provided for a task because a designer believes such assignment to be helpful to the user. There is no objective means to decide the best type of agent to assign, e.g., whether to assign a wizard, a guide, or no agent. Intelligent user interface agents are costly to develop and consume system resources when used. Inappropriate application of intelligent agents wastes both development and execution resources. In addition, inappropriate application may hinder rather than enhance the user interface by getting in the way of task performance where the user knows how to perform the task or by providing insufficient direction to complete the task successfully.

Thus, the technical problem exists of determining the optimal assignment of intelligent agents to human-computer interaction tasks so that tasks provided with agents need them and the appropriate class of agent is assigned to those tasks.

SUMMARY OF THE INVENTION

The present invention is directed to providing a computer implemented process or computer system for determining the class of intelligent agent, if any, to assign to human-computer interface tasks. The process of the preferred embodiment analyzes a set of user interface task characteristics, and clusters the tasks based on those characteristics. Clusters are assigned a specific class of intelligent agents based upon the characteristics common to that cluster.

The present invention is directed to a computer implemented method of assigning each of two or more intelligent agents to one of a plurality of mutually exclusive groups of tasks. The method comprises the steps of: receiving data assessing at least two user assessment variables for each of the plurality of tasks; performing multivariate analysis on the data to derive from the plurality of tasks at least as many mutually exclusive clusters of tasks as there are intelligent agents to assign; storing in a computer system an association linking each of the intelligent agents with one of the mutually exclusive clusters.

It is therefore an object of the invention to provide a process for grouping tasks for the application of intelligent agent classes.

It is yet another object of the invention to provide a system for classifying tasks and for applying intelligent agent technology to those tasks.

The foregoing and other objects, features and advantages of the invention will be apparent from the following more particular description of a preferred embodiment of the invention, as illustrated in the accompanying drawing in which like reference numbers represent like parts of the invention.

DETAILED DESCRIPTION

Figure 1:
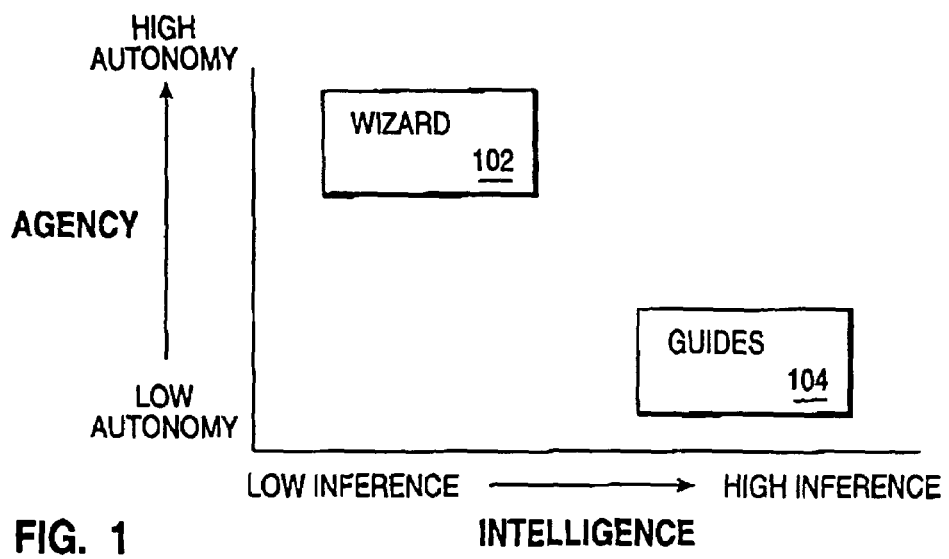
FIG. 1 is a diagram illustrating the relationship between intelligence and agency in computer implemented agents.
Figure 2:
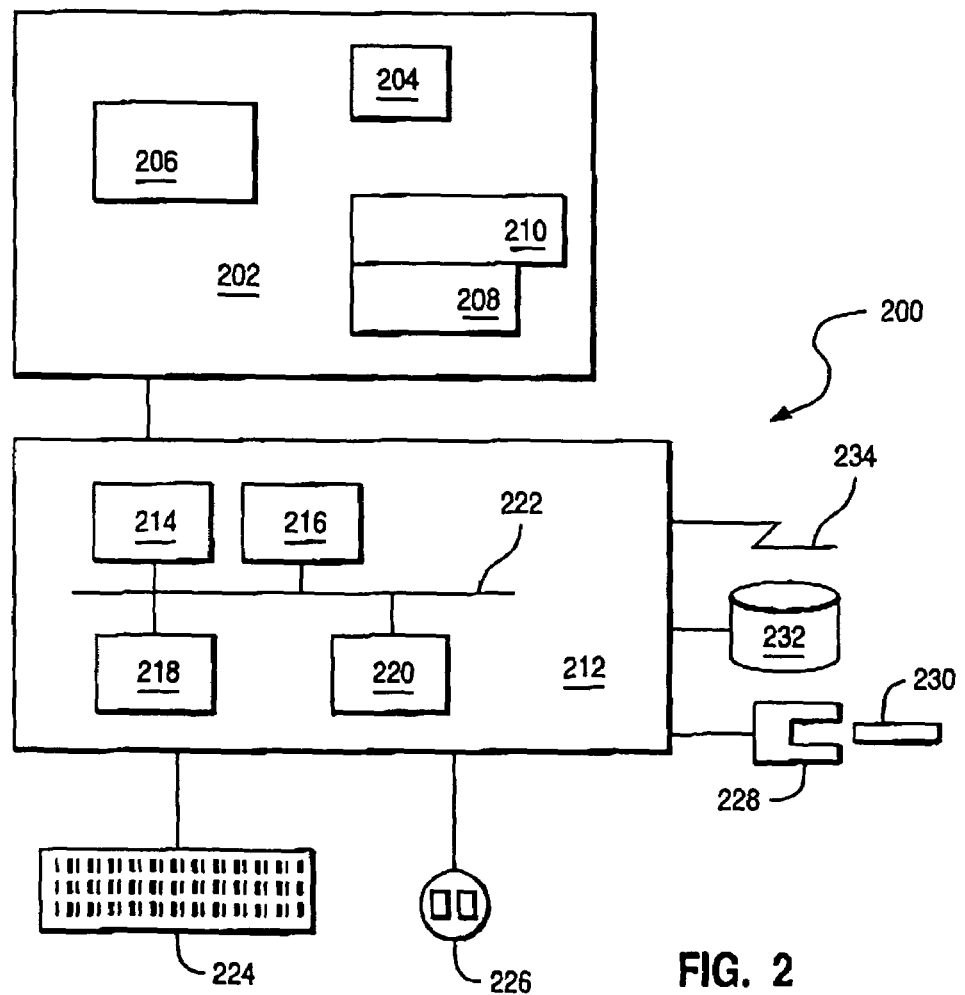
FIG. 2 is a block diagram of a computer system for implementing the preferred embodiment of the present invention.

Intelligent user interface agents are applicable to computer systems such as that shown in FIG. 2. Computer system 200 includes a graphic display 202 that displays a number of user interface objects 204, 206, 208, 210. The processing system 212 contains a processor complex 214 with one or more central processing units (CPUs), random access memory 216, input/output controller 218, and network controller 220 connected by system bus 222. Input/output controller 218 controls the graphic display 202, a keyboard 224, pointing device 226, fixed storage 232, and removable storage 228, 230. Network controller 220 controls communication with a local area network (LAN) or a wide area network (WAN) through connection 234.

The preferred embodiment is implemented on an IBM Personal Computer with an Intel® processor and the IBM OS/2® operating system. The intelligent agents become part of the operating system. However, the analysis and selection can be done on the same or a different operating system.

Guides add value to frequent rather than infrequent tasks. A traditional user interface offers the user a multitude of behavior options. Guides emphasize behavior options by annotating the interface rather than replacing the interface. Guides use artificial intelligence to determine a user's competence at the task and adjust the annotation accordingly. When the user is determined to be competent at the task, annotation is eliminated. This process enables the user to learn the basic interface for frequently performed tasks.

Infrequent, difficult tasks are best assisted by wizards. The wizard breaks the task into steps performable by the user. The wizard replaces the basic user interface with a new, task oriented interface. This enables the user to accomplish the task successfully, but does not instruct the user in the standard interface. Since the task is infrequently performed, instruction is of less value.

User interface agents add value to difficult tasks but not to easy tasks. Users can complete easy tasks successfully without the assistance of agents. Agents add more value to important tasks than unimportant tasks. Users can better afford to fail at unimportant tasks than they can at important tasks. Tasks performed infrequently often require more assistance than those performed frequently. The user benefits from educational assistance on frequently performed tasks so that they can be performed through the standard interface without the overhead of a wizard.

Thus, the three variables relevant to the selection and application of intelligent agents to user interface tasks are the task difficulty, the task importance and the task frequency. Data must be collected for each of these variables for each task under consideration for the application of an intelligent agent. The preferred embodiment uses three variables, though the process is applicable to analyses on a greater number of assessment variables.

Figure 3:
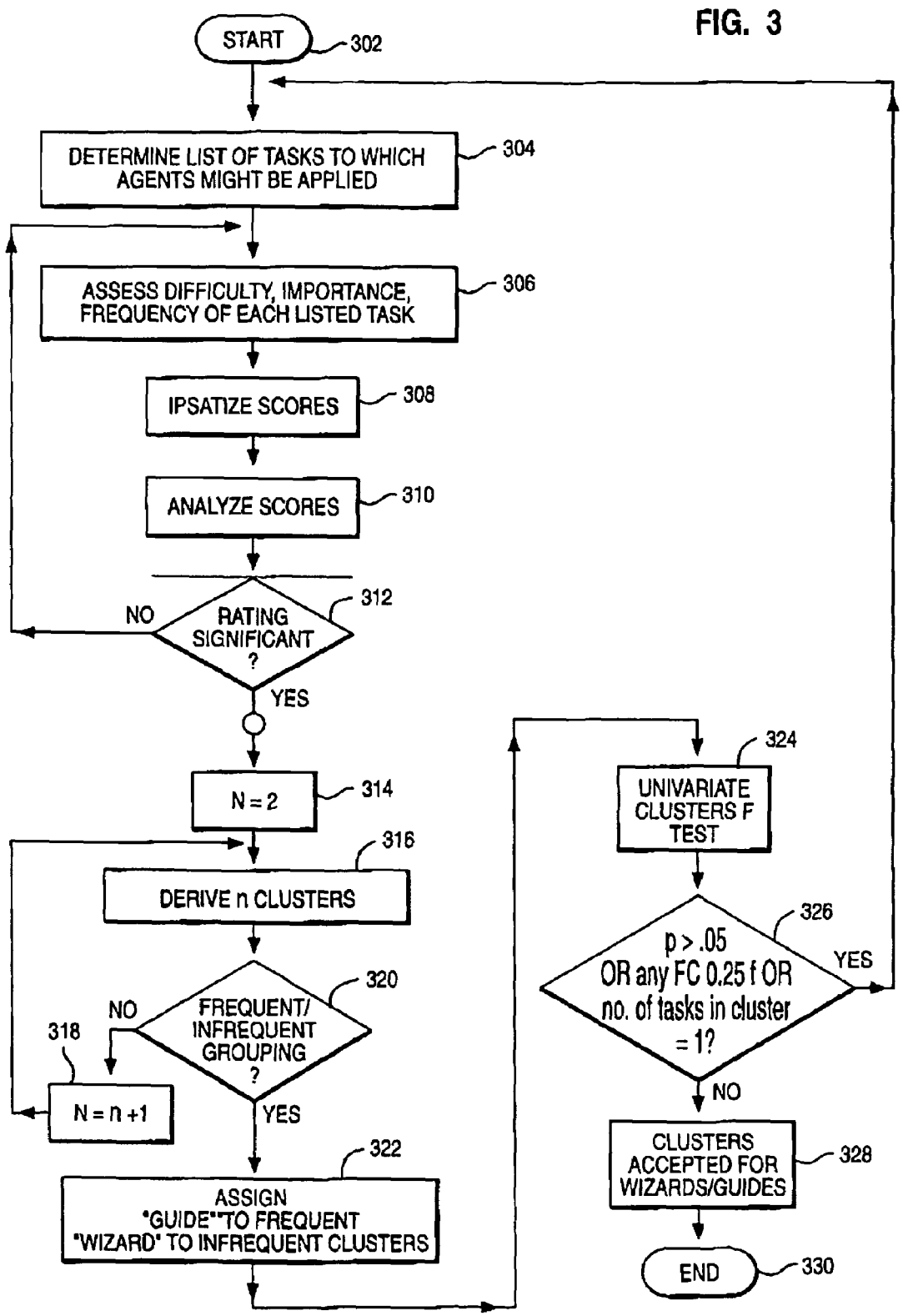
FIG. 3 is a flowchart depicting the process steps of the preferred embodiment of the present invention.

The process for determining the application of intelligent agents will be described with reference to FIG. 3. The process begins at step 302 and proceeds to the step of determining the universe of tasks that are candidates for the application of intelligent interface agents at step 306 each of the identified tasks is evaluated by a representative sample of potential users to determine the level of difficulty, importance and frequency. This assessment results in a measured score for each variable for each user in the sample. The sample scores are ipsatized at step 308 remove individual variances. In the preferred embodiment the raw score for each variable is adjusted by subtracting the respondent mean and then dividing by the respondent standard deviation so that the transformed respondent mean and standard deviation are zero and one respectively.

The scores are then analyzed at step 310. Each rating dimension (difficulty, importance, frequency) was analyzed by task. Repeated measures analysis of variance were performed on the transformed scores to decide whether the metrics were assessed reliably. The rating dimension within a subject factor must be significant for the results to be reliable. Significance is determined at step 312 evaluating the probability that the result would occur by chance in a set of multiple trials. In the preferred embodiment, this probability must be less that 0.05 for the results to be deemed significant.

Finally, MacQueens k-means multivariate clustering analysis is used to cluster the tasks into mutually exclusive clusters. The MacQueens analysis is described in *SPSS Reference Guide*, SPSS, Inc., 1990, Chicago. The analysis begins by dividing the tasks into at least two clusters 314, 316. The number of clusters initially selected is based on the number of different types of intelligent agents to be applied. In the preferred embodiment this number is two. The clusters are examined until a solution distinguishes as determined at step 320 at least one cluster of relatively difficult, important and frequent tasks (the "guide tasks") and a cluster of relatively difficult, important and infrequent tasks (the "wizard clusters".) If distinct clusters are not found, the number of clusters is increased by one at step 318 and the analysis repeated until distinguishable solutions are found. The clusters are assigned at step 322 and then subjected to univariate F test analysis at step 324 of the three rating dimensions. This test determines the degree to which each dimension reliably distinguishes the clusters. If at step 326 any of the F statistics are small enough that the p values would be greater than 0.05, or any F statistic is less than one fourth the size of any other F statistic, or the number of tasks in the most populated guide or wizard cluster is one, then the cluster analysis is invalid for the set of tasks examined. The analysis must be repeated.

Valid clusters are accepted at step 32 and assigned to receive guide or wizard intelligent agents ending the process at terminal 330. If more types of intelligent agents are to be applied, they are assigned based on the variable characteristics of each mutually exclusive cluster. When more clusters are derived than there are agents to apply, the agents are applied to the clusters where variable characteristics best match the agent's characteristics.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

The invention claimed is:

1. A computer implemented method of providing a graphical user interface agent to a user performing a task in a computer system comprising a processor, an operating system, memory, and a plurality of intelligent agents, comprising the steps of:

receiving data assessing at least two user assessment variables for each of a plurality of tasks;

performing multivariate analysis on said data to derive from said plurality of tasks at least as many mutually exclusive clusters of tasks as there are intelligent agents to assign;

storing an association linking each of said intelligent agents with one of said mutually exclusive clusters; and upon user selection of a task, displaying an intelligent agent associated with a cluster containing the task selected by the user.

2. The method of claim 1, further comprising the step of: transforming said multivariate data to eliminate individual respondent differences.

3. The method of claim 2 further comprising the step of:
performing univariate analysis on each of said assessment variables to validate cluster derivation.

4. The method of claim 1, wherein said intelligent agents include a first "wizard" agent applicable to infrequent, difficult tasks and a second "guide" applicable to frequent tasks, and wherein the multivariate analysis step comprises the steps of:
separating said tasks into two groups based on a frequency variable;
performing multivariate statistical analysis on said two groups to determine whether the groupings are statistically distinct;
if not distinct, creating an additional group and performing said multivariate analysis again until a statistically distinct set of groups is found.

5. A system for providing a graphical user interface agent to a user performing a task on a computer system comprising a processor means, storage means and input/output means, and a plurality of intelligent agents, the system comprising:
means for receiving data assessing at least two user assessment variables for each of a plurality of tasks;
means for performing multivariate statistical analysis on said data to determine at least as many statistically distinct groups of tasks as there are intelligent agents to assign;
means for storing in said storage means an association linking each of said intelligent agents with one of said statistically distinct groups; and
means, operable upon user selection of a task, for displaying an intelligent agent associated with a group of tasks containing the task selected by the user.

6. The system of claim 5, further comprising:
means for transforming said multivariate data to eliminate individual respondent differences; and
means for performing univariate analyses on each of said assessment variables to validate cluster groupings.

7. The system of claim 5, wherein said intelligent agents include a first "wizard" agent applicable to infrequent, difficult tasks and a second "guide" agent applicable to frequent tasks, and wherein the means for performing multivariate analysis comprises:
means for separating said tasks into two groups based on a frequency variable;
means for performing multivariate statistical analysis on said two groups top determine whether the groupings are statistically distinct; and
if not distinct, means for creating an additional group and means for performing said multivariate analysis again until a statistically distinct set of groups is found.

8. A computer program product including a computer readable medium having computer program logic recorded thereon for use in a data processing system for providing a graphical user interface agent to a user performing a task comprising:
means for receiving data assessing at least two user assessment variables for each of said tasks;
means for performing multivariate statistical analysis on said data to determine at least as many statistically distinct clusters of tasks as there are intelligent agents to assign;
means for storing in said storage means an association linking each of said intelligent agents with one of said statistically distinct clusters; and
means for displaying an intelligent agent using a stored association when a user of said data processing system executes a task from one of said statistically distinct clusters.

9. The computer program product of claim 8, further comprising:
means for transforming said multivariate data to eliminate individual respondent differences; and
means for performing univariate analyses on each of said assessment variables to validate cluster groupings.

* * * * *